(12) United States Patent
Yamamoto (10) Patent No.: US 11,281,949 B2
(45) Date of Patent: Mar. 22, 2022

(54) IMAGE FORMING APPARATUS AND IMAGE FORMATION METHOD

(71) Applicant: KYOCERA Document Solutions Inc., Osaka (JP)

(72) Inventor: Takenori Yamamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/016,170

(22) Filed: Sep. 9, 2020

(65) Prior Publication Data

US 2021/0073603 A1   Mar. 11, 2021

(30) Foreign Application Priority Data

Sep. 10, 2019  (JP) .............................. JP2019-164633

(51) Int. Cl.

| G06K 15/02 | (2006.01) |
| G06K 15/16 | (2006.01) |
| G06F 3/12 | (2006.01) |
| G06K 15/00 | (2006.01) |

(52) U.S. Cl.
CPC ......... *G06K 15/408* (2013.01); *G06K 15/002* (2013.01); *G06K 15/16* (2013.01); *G06K 15/4065* (2013.01)

(58) Field of Classification Search
None
See application file for complete search history.

(56) References Cited

U.S. PATENT DOCUMENTS

| 6,594,401 B1 * | 7/2003 | Metcalfe .............. H04N 1/4095 382/173 |
| 8,016,499 B2 * | 9/2011 | Narusawa ................. B41J 3/44 400/76 |
| 2011/0188753 A1 * | 8/2011 | Wada ....................... G06K 9/34 382/176 |
| 2017/0076185 A1 * | 3/2017 | Mizuno ................ H04N 1/0035 |
| 2020/0398555 A1 * | 12/2020 | Nishihara ................ B41J 2/155 |
| 2021/0021726 A1 * | 1/2021 | Yamaguchi ........ H04N 1/00663 |

FOREIGN PATENT DOCUMENTS

| JP | 2000-289275 A | 10/2000 |
| JP | 2008-065309 A | 3/2008 |

* cited by examiner

*Primary Examiner* — Beniyam Menberu (74) *Attorney, Agent, or Firm* — Studebaker & Brackett PC (57) ABSTRACT

An image forming apparatus includes a medium reading section that acquires medium area data in a conveyance path, an image formation controller that sets a target pixel as a mask processing target where ink ejection is restricted when the target pixel is outside an image formable area, an anomaly estimation section that uses positions of a mask start pixel and a mask end pixel to estimate a cause of the mask processing target and generates a first text message indicating a result of estimation on the cause of the mask processing target, and an operation display section that, according to occurrence of the mask processing target, displays the first text message and an area as the mask processing target with a display generated using the position of the mask start pixel and the position of the mask end pixel superimposed on the image represented by the image data.

9 Claims, 10 Drawing Sheets

Hole

FIG. 8A

Error display screen

IMAGE FORMING APPARATUS AND IMAGE FORMATION METHOD

INCORPORATION BY REFERENCE

The present application claims priority under 35 U.S.C. § 119 to Japanese Patent Application No. 2019-164633, filed on Sep. 10, 2019. The contents of this application are incorporated herein by reference in their entirety.

BACKGROUND

The present disclosure relates to an image forming apparatus and an image formation method and particularly to technology for identifying a cause of ejection of ink to places outside an image forming medium.

In the commercial printing industry, an anomaly related to printing media or conveyance thereof due to performance of a large amount of printing processing results in ejection of ink to places outside printing media. To address such a problem in for example an ink jet type image forming apparatus that prints on an entire surface, a technique has been proposed that improves precision in detecting width of a recording medium while improving a printing speed to appropriately reduce an amount of stray ink. There is still another technology that stops output of an image when a printing size of image data for the image does not match a size of a print medium to avoid wasting paper and also to cause a host computer device to display an error image, thereby providing visual confirmation of what kind of error it is.

SUMMARY

An image forming apparatus according to an aspect of the present disclosure includes an image forming section, a conveyance section, a medium reading section, an image processing section, an image formation controller, an anomaly estimation section, and an operation display section. The image forming section ejects ink on an image formation medium based on image data to form an image. The conveyance section has a conveyance path along which the image formation medium is to be conveyed to the image forming section. The medium reading section acquires medium area data in the conveyance path. The medium area data is data for identifying an image formable area. The image formable area is an area on the image formation medium on which the image is to be formed. The image processing section forms ink dots as pixels constituting the image, thereby generating image formation control data for reproducing the image data. The image formation controller selects a target pixel from the pixels, and determines whether or not the target pixel selected is in the image formable area based on the medium area data. The image formation controller sets the target pixel as a target of ink ejection if it is determined that the target pixel selected is in the image formable area, and sets the target pixel as a mask processing target where the ink ejection is restricted if it is determined that the target pixel selected is outside the image formable area. The anomaly estimation section acquires a position of a mask start pixel and a position of a mask end pixel, uses the position of the mask start pixel and the position of the mask end pixel to estimate a cause of the mask processing target, and generates a first text message indicating a result of estimation on the cause of the mask processing target. The position of the mask start pixel and the position of the mask end pixel are positions relative to the image represented by the image data. The mask start pixel is a target pixel first determined to be the mask processing target. The mask end pixel is a target pixel last determined to be the mask processing target. According to occurrence of the mask processing target, the operation display section displays the first text message and an area as the mask processing target with a display superimposed on the image represented by the image data. The display is generated using the position of the mask start pixel and the position of the mask end pixel and represents the area as the mask processing target.

An image formation method according to an aspect of the present disclosure includes: forming an image based on image data by an image forming section that ejects ink on an image formation medium to form the image; having a conveyance path along which the image formation medium is to be conveyed to the image forming section; acquiring medium area data in the conveyance path, the medium area data being data for identifying an image formable area, the image formable area being an area on the image formation medium on which the image is to be formed; forming ink dots as pixels constituting the image, thereby generating image formation control data for reproducing the image data; selecting a target pixel from the pixels, determining whether or not the target pixel selected is in the image formable area based on the medium area data, setting the target pixel as a target of ink ejection if it is determined that the target pixel selected is in the image formable area, and setting the target pixel as a mask processing target where the ink ejection is restricted if it is determined that the target pixel selected is outside the image formable area; acquiring a position of a mask start pixel and a position of a mask end pixel, using the position of the mask start pixel and the position of the mask end pixel to estimate a cause of the mask processing target, and generating a first text message indicating a result of estimation, the position of the mask start pixel and the position of the mask end pixel being positions relative to the image represented by the image data, the mask start pixel being a target pixel first determined to be the mask processing target, the mask end pixel being a target pixel last determined to be the mask processing target, the result of estimation being on the cause of the mask processing target; and displaying, according to occurrence of the mask processing target, the first text message and an area as the mask processing target with a display superimposed on the image represented by the image data, the display being generated using the position of the mask start pixel and the position of the mask end pixel and representing the area as the mask processing target.

DETAILED DESCRIPTION

An embodiment of the present disclosure will be described with reference to the accompanying drawings.

Figure 1:
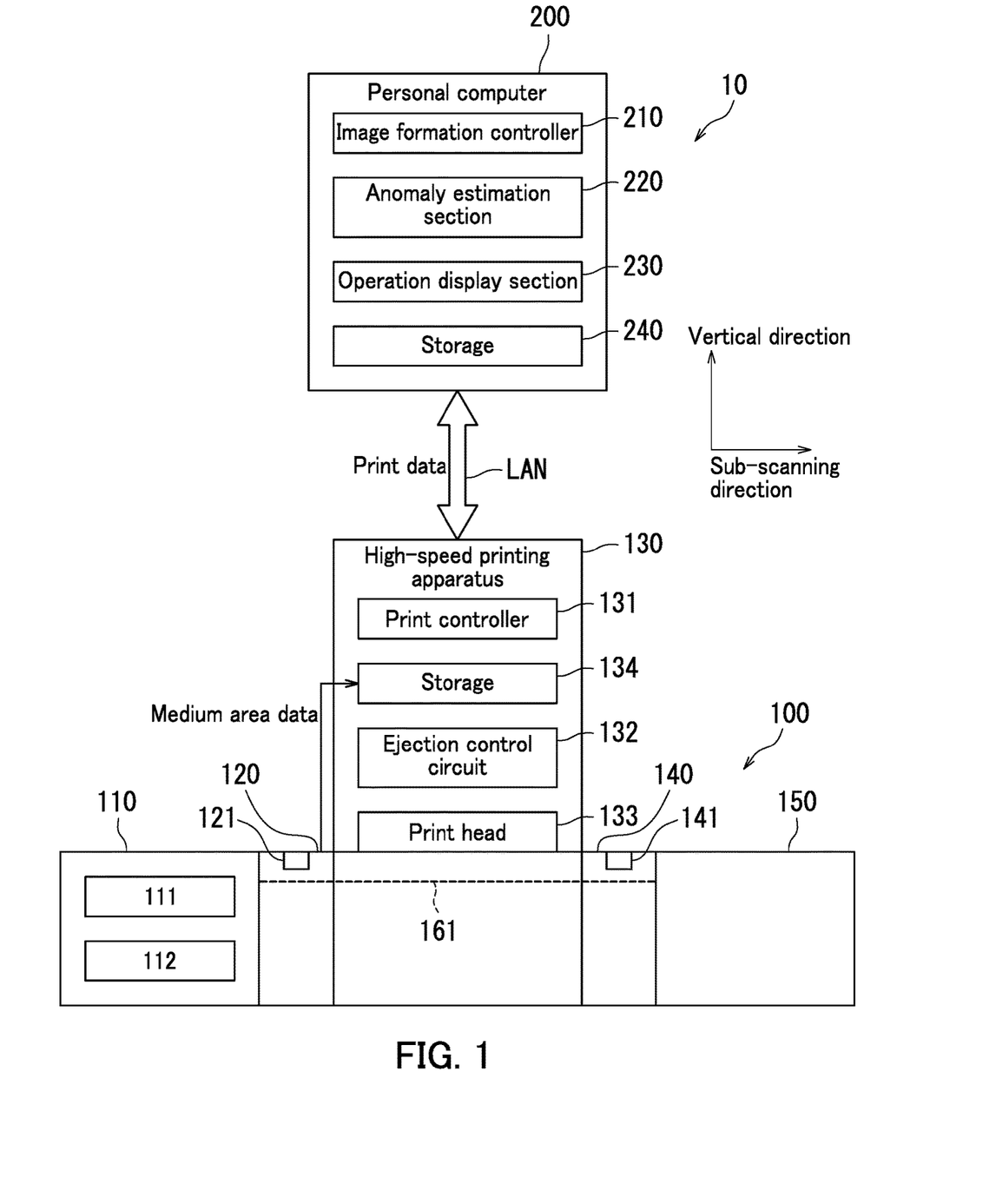
FIG. 1 is a block diagram illustrating a functional structure of a high-speed printing system according to an embodiment of the present disclosure.

FIG. 1 is a block diagram illustrating a functional structure of a high-speed printing system 10 according to the embodiment of the present disclosure. The high-speed printing system 10 includes a high-speed printing apparatus 100, a personal computer 200, and a local area network (LAN). The LAN connects the personal computer 200 and the high-speed printing apparatus 100. The high-speed printing apparatus 100 corresponds to an image forming apparatus.

The personal computer 200 includes an image formation controller 210, an anomaly estimation section 220, an operation display section 230, and storage 240. The image formation controller 210 functions as an image processing section, and applies color conversion processing and halftone processing (raster image processing (RIP)) to image data, thereby generating print data. The print data is dot data for reproducing an image with ink used by an image forming unit 130. The operation display section 230 functions as a touch panel, and displays various menus as input screens to receive user operation input. A function of the anomaly estimation section 220 will be described later. The print data corresponds to image formation control data.

The image formation controller 210 includes main storage such as random-access memory (RAM) and read-only memory (ROM), and a controller such as a micro-processing unit (MPU) and a central processing unit (CPU). The storage 240 includes a storage device (not illustrated) including a hard disk drive, flash memory, and the like, and stores process control programs, the image data, and the like. The process control programs include an image forming program to be performed by the personal computer 200.

The high-speed printing apparatus 100 includes a print medium supply section 110, a mask data generator 120, the image forming unit 130, an image reading section 140, a printed matter container 150, and a medium conveyance section 160. The medium conveyance section 160 includes a medium conveyor belt 161 and a registration roller pair 162 (see FIG. 2). The medium conveyor belt 161 conveys a sheet of printing paper supplied from the print medium supply section 110 to the mask data generator 120, the image forming unit 130, the image reading section 140, and the printed matter container 150 in the stated order. The image reading section 140 corresponds to a medium reading section.

The image forming unit 130 includes a print controller 131, an ejection control circuit 132, a print head 133, and storage 134. The image forming unit 130 forms CMYK (cyan, magenta, yellow, and key) ink dots as pixels constituting an image to reproduce a print target image on a sheet of printing paper. The print target image is a target to be printed. The print head 133 ejects CMYK ink droplets. The ejection control circuit 132 outputs ejection control signals for ejecting the CMYK ink droplets based on the print data. The print controller 131 controls the whole of the high-speed printing apparatus 100.

The storage 134 includes a storage device (not illustrated) including a hard disk drive, flash memory, and the like and stores process control programs, data, and the like.

The process control programs are performed by the print controller 131. The storage 134 inputs and stores dot data (image formation control data) from the personal computer 200 as print data and supplies the print data to the ejection control circuit 132. The dot data indicates a formation state of CMYK dots after RIP.

The ejection control circuit 132 outputs ejection control signals based on the dot data. Each of the ejection control signals indicates an ink droplet size per color in 5 levels of S, M, L, LL and 3L for example. The ejection control signals are generated by applying mask processing to the print data based on mask signals. The image forming unit 130 can form CMYK ink dots in 5-level droplet-size based on the ejection control signals.

Figure 2:
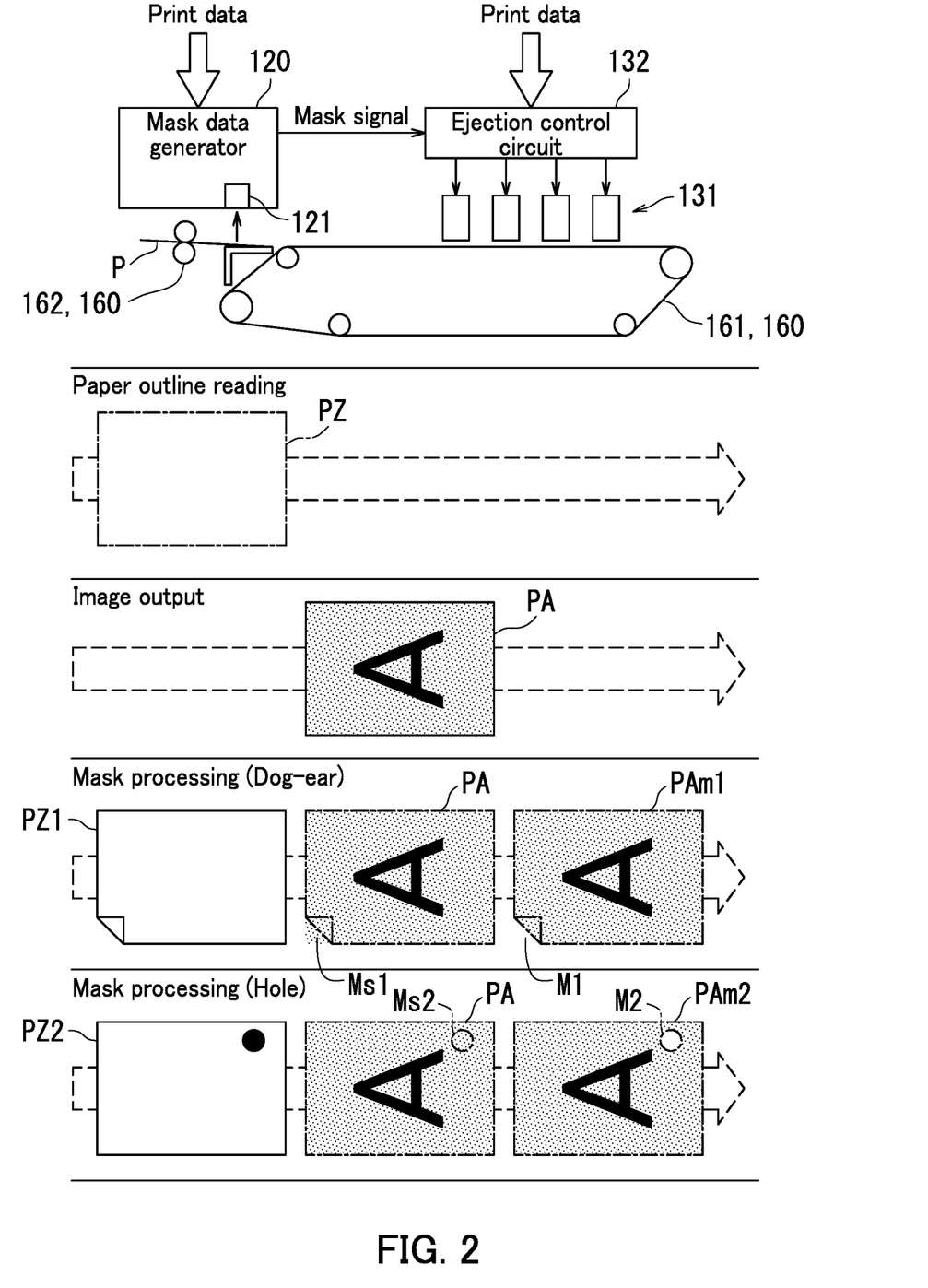
FIG. 2 is a descriptive diagram illustrating an overview of mask processing in the embodiment.

The registration roller pair 162 conveys the sheet of printing paper to the medium conveyor belt 161 according to timing of image formation (ink ejection process) in the medium conveyor belt 161. The sheet of printing paper corresponds to a print medium or an image formation medium. The image forming unit 130 corresponds to an image forming section.

The print medium supply section 110 includes a first cassette 111 and a second cassette 112. The first cassette 111 stores for example A4 size printing paper. The second cassette 112 stores for example A3 size printing paper. Note that the print medium supply section 110 may be configured to store a roll of roll paper (not illustrated) and supply a sheet of roll paper as a print medium from the roll. In this example, the high-speed printing apparatus 100 is configured so that the A3 size is printable maximum width. That is, a size in a widthwise direction of the A3 size is a size in a main scanning direction.

FIG. 2 is a descriptive diagram illustrating an overview of mask processing in the embodiment. The mask data generator 120 includes a contact image sensor (CIS) type monochrome line scanner 121 arranged in a conveyance path for conveying a sheet of printing paper to the image forming unit 130. The monochrome line scanner 121 includes a light source (not illustrated) and one charge-coupled device (CCD) line sensor (not illustrated). The light source emits light to the sheet of printing paper that is on the medium conveyor belt 161 and being conveyed in a sub-scanning direction. The line sensor is arranged along the main scanning direction intersecting the sub-scanning direction.

The monochrome line scanner 121 captures an image of a sheet of printing paper P that is on the medium conveyor belt 161 and being conveyed in the sub-scanning direction, and generates medium area data representing a medium area PZ of the sheet of printing paper P. The medium area PZ is an area in which an image formation medium to receive CMYK ink droplets is present. The print data is dot data representing a CMYK dot formation state after RIP.

The mask data generator 120 detects dot formation in an area in which the image formation medium is not present, that is, ejection outside the medium, and generates medium area data for eliminating the outside-medium ejection. This approach enables the high-speed printing apparatus 100 to prevent the medium conveyor belt 161 or a printed matter from being contaminated due to the ink droplets ejected outside the medium.

Specifically, in the case where a sheet of printing paper P is dog-eared (see FIG. 2), the monochrome line scanner 121 generates medium area data representing a medium area PZ1. Thus, the image forming unit 130 restricts ejection of ink droplets to places outside the medium area PZ1, namely, eliminates ejection of ink droplets to an outside-medium area Ms1 to generate a printed matter PAm1 after mask processing. The printed matter PAm1 has a mask area M1. By contrast, in the case where a sheet of printing paper P has a hole (see FIG. 2), the monochrome line scanner 121 generates medium area data representing a medium area PZ2. Thus, the image forming unit 130 eliminates ejection of ink droplets to an outside-medium area Ms2 to generate a printed matter Pam2 after mask processing. The printed matter Pam2 has a mask area M2.

The image reading section 140 includes a CIS-type color line scanner 141 arranged in the main scanning direction. The image reading section 140 includes a light source (not illustrated) and three RGB (red, green, and blue) CCD line sensors (not illustrated). The light source emits light to a printed matter that is on the medium conveyor belt 161 and being conveyed in the sub-scanning direction. The line sensors are arranged in the main scanning direction. The image reading section 140 is used in a printed matter quality confirmation process. This process is a process of confirming quality of a printed matter where a desired image is formed on a sheet of printing paper. The printed matter container 150 contains the sheet of paper whose quality has been confirmed in the printed matter quality confirmation process.

Figure 3:
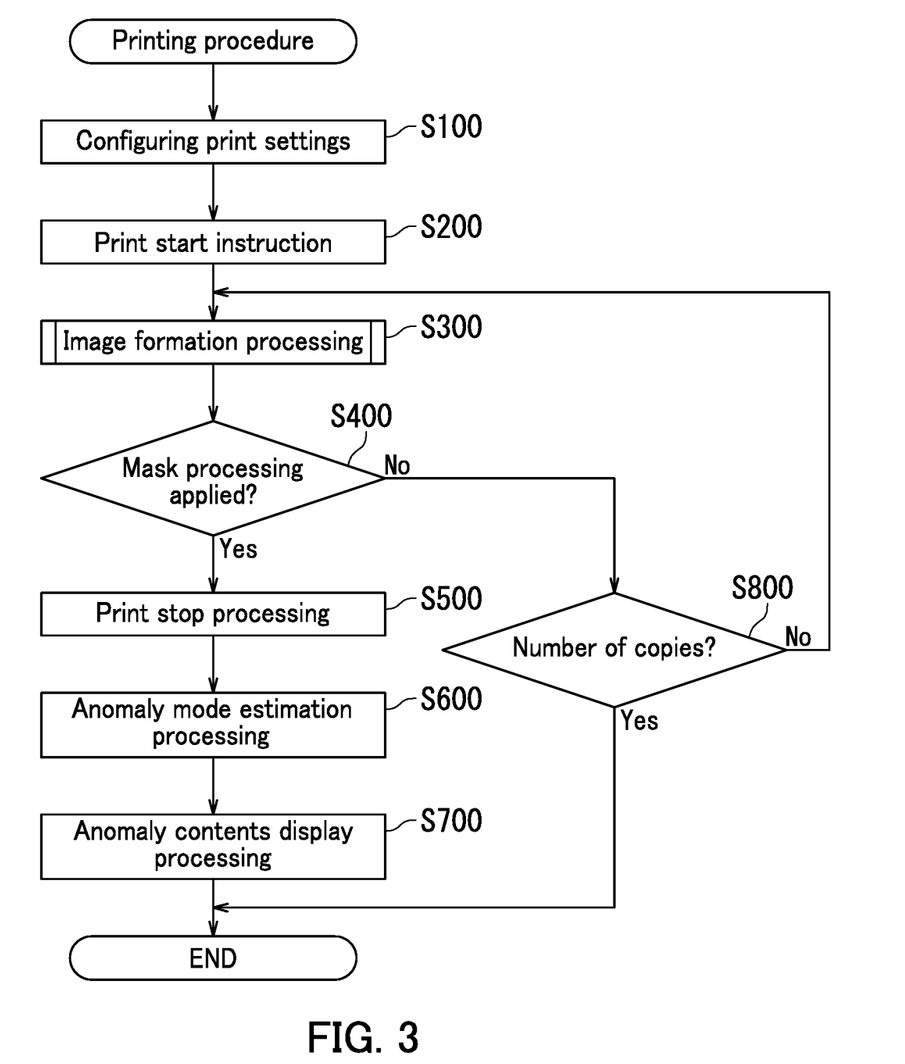
FIG. 3 is a flowchart illustrating a procedure for printing in the embodiment.

FIG. 3 is a flowchart illustrating a procedure for printing in the embodiment. In Step S100, a user configures or changes print settings. In configuring the print settings, the user confirms content of image data on the operation display section 230 of the personal computer 200, and sets a halftone processing method and the number of copies for example.

In Step S200, the user confirms contents of the print settings and instructs the personal computer 200 to start printing. The high-speed printing system 10 accordingly starts printing. The process then proceeds to step S300.

Figure 4:
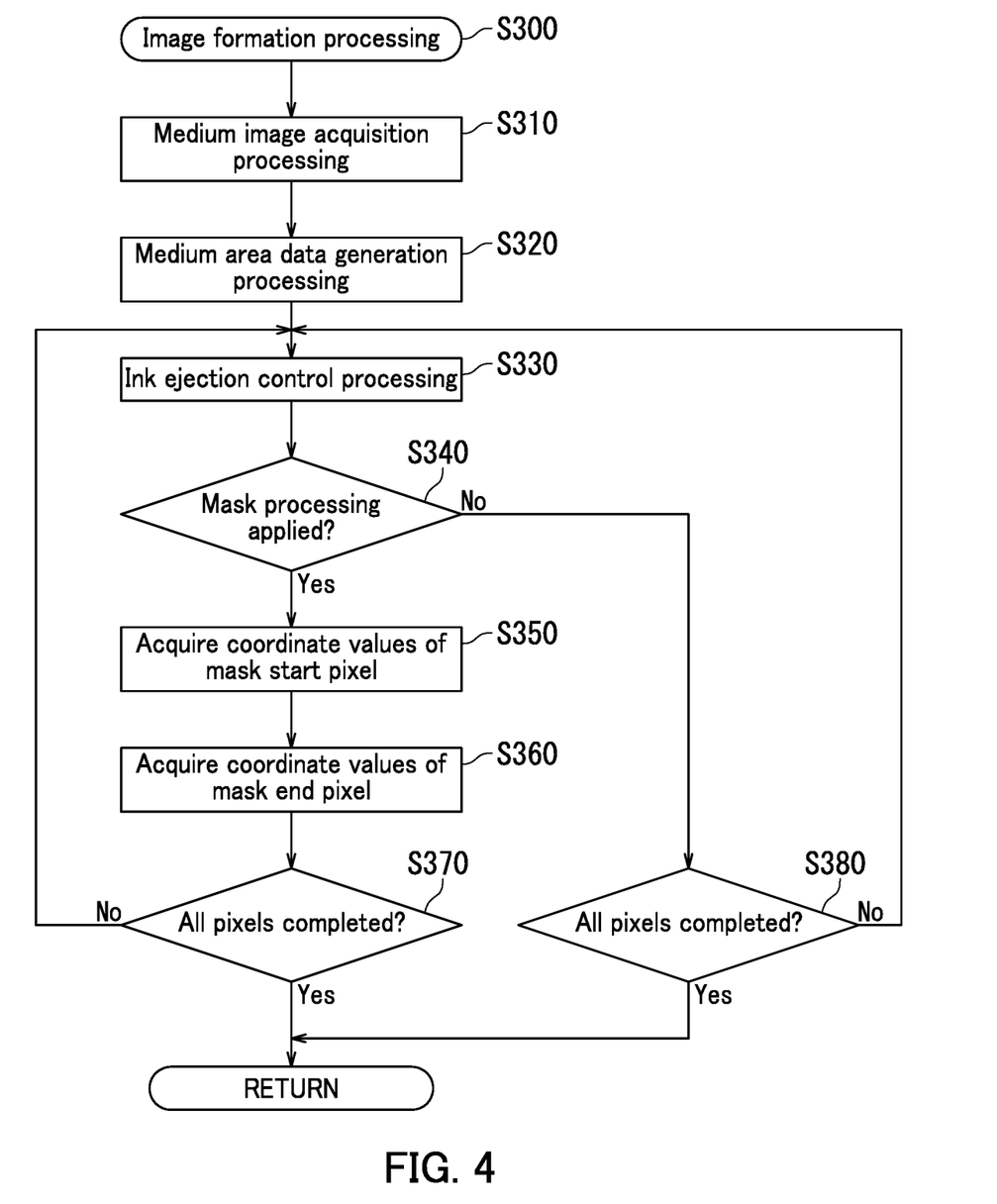
FIG. 4 is a flowchart illustrating a procedure for an image formation processing in the embodiment.
Figure 5:
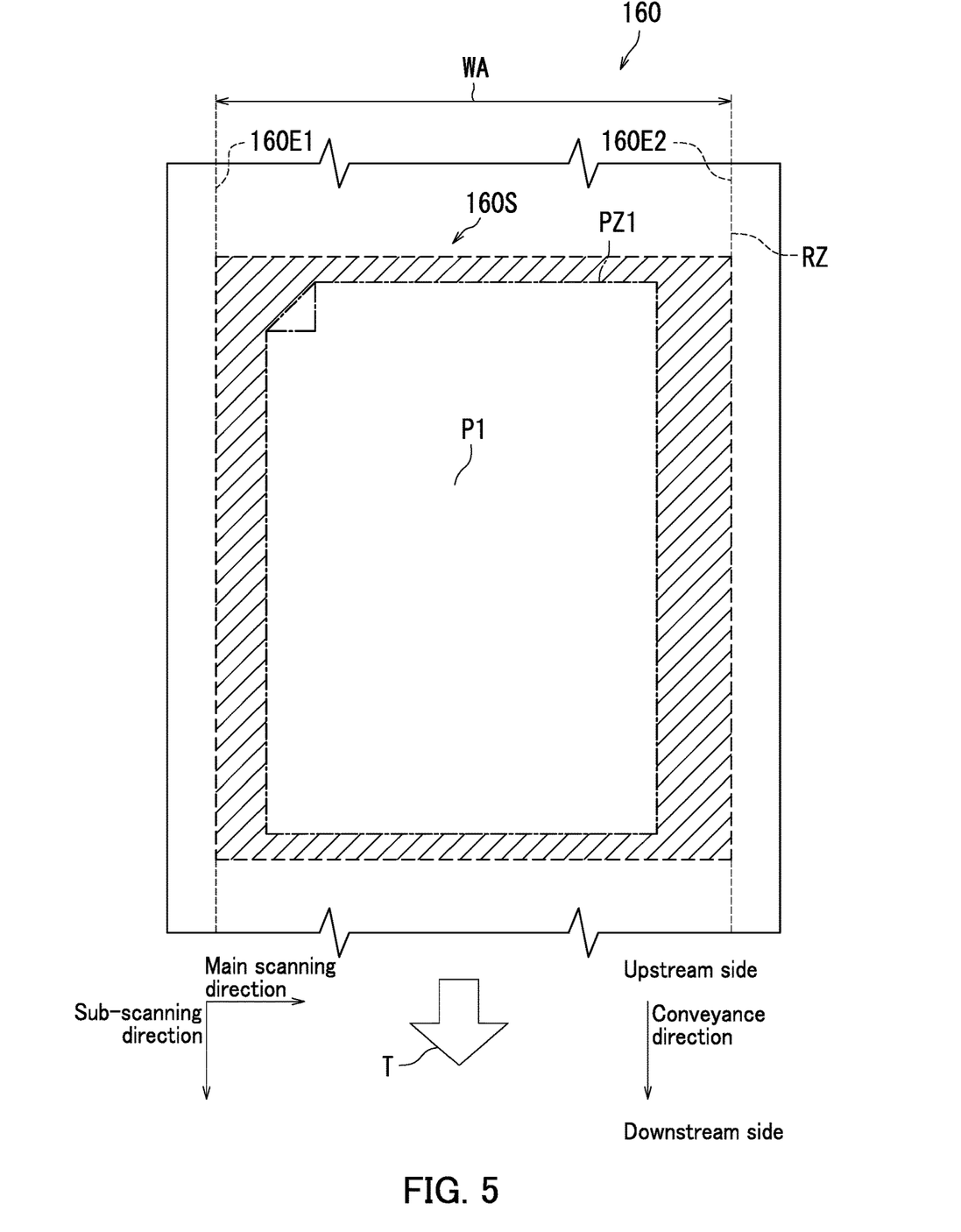
FIG. 5 is a descriptive diagram illustrating a medium conveyance surface of a medium conveyor belt in the embodiment.

FIG. 4 is a flowchart illustrating procedure for image formation processing (Step S300) in the embodiment. FIG. 5 is a descriptive diagram illustrating a medium conveyance surface 160S of the medium conveyor belt 161 in the embodiment. In this example, the medium conveyor belt 161 conveys a sheet of printing paper P1 in a conveyance direction T to supply the sheet to the image forming unit 130. The sheet of printing paper P1 is A3 in size and supplied from the print medium supply section 110. The medium conveyance surface 160S has a color that is significantly different from white, for example a gray color. In FIG. 5, the gray color is hatched.

A printable width WA is set on the medium conveyance surface 160S. The printable width WA is the maximum printable width in the main scanning direction. The printable width WA is set between a first printable edge position 160E1 and a second printable edge position 160E2. The image forming unit 130 is capable of ejecting ink droplets within the printable width WA.

In Step S310, the mask data generator 120 performs medium image acquisition processing. In the medium image acquisition processing, the mask data generator 120 acquires a conveyance image that is an image of a sheet of printing paper P1 being conveyed. The conveyance image is an image of the sheet of printing paper P1 within an image reading range RZ. The image reading range RZ is set on the medium conveyance surface 160S in advance. The image reading range RZ is set to have a range equal to the printable width WA. In this example, the sheet of printing paper P1 is dog-eared, and the monochrome line scanner 121 generates medium area data from the conveyance image. The medium area data represents the medium area PZ1.

In Step S320, the mask data generator 120 performs medium area data generation processing. In the medium area data generation processing, the mask data generator 120 sets a threshold to make thresholding (binarizing) with each of first pixel values and each of second pixel values respectively assigned "0" and "1", thereby generating medium area data. The threshold is used for discriminating the color of the sheet of printing paper P1 and the gray color of the medium conveyance surface 160S. The first pixel values are respective values of pixels representing the sheet of printing paper P1. The second pixel values are respective values of pixels representing the medium conveyance surface 160S.

The mask data generator 120 maps the binary data to a coordinate system of print data within the image reading range RZ, and generates the medium area data. In the present embodiment, the medium area data is data for identifying an image formable area in the coordinate system of print data. The image formable area is an area on a sheet of printing paper on which an image is to be formed. The mask data generator 120 stores the medium area data in the storage 134.

In Step S330, the print controller 131 performs ink ejection control processing. In the ink ejection control processing, the print controller 131 generates control data for ink ejection processing based on the print data. Specifically, the print controller 131 selects a target pixel that is a processing target in CMYK print data. If a pixel value corresponding to the target pixel in the medium area data is "0", the print controller 131 outputs a control signal for ink ejection to the ejection control circuit 132 to put the ejection control circuit 132 in a state capable of ejecting an ink droplet with a predetermined size (ink ejection target). If the pixel value in the medium area data is "1", the print controller 131 masks (cuts) the control signal to eliminate (prohibit or limit) the ink ejection. Such masking corresponds to mask processing or pixel removal.

In Step S340, the process by the print controller 131 proceeds to Step S350 if the mask processing is performed, and proceeds to step S380 if the mask processing is not performed. In Step S380, the process by the print controller 131 returns to Step S330 until processing of all pixels is completed, and the print controller 131 performs the ink ejection control processing for the next target pixel.

In Step S350, the print controller 131 acquires coordinate values of a mask start pixel. The mask start pixel is a pixel on which the mask processing is first performed in a print target area PA, and has coordinates. The print target area PA is a print target area based on the print data. The print controller 131 stores coordinate data representing the mask start pixel in a first predetermined storing area of the storage 134.

In Step S360, the print controller 131 acquires coordinate values of a mask end pixel. The mask end pixel is a pixel on which the mask processing is last performed in the print target area PA based on the print data, and has coordinates. The print controller 131 stores coordinate data representing each of second and subsequent mask pixels in a predetermined second storage area of the storage 134.

In Step S370, the process by the print controller 131 returns to Step S330 until processing of all pixels is completed, and the print controller 131 performs the ink ejection control processing for the next target pixel. Thus, the coordinate data representing each of second and subsequent mask pixels is sequentially stored in the second storage area to be renewed. As a result, coordinate data of a pixel on which the mask processing is last performed is stored in the second storage area.

In Step S400, the process by the print controller 131 proceeds to Step S500 if the mask processing has been applied to at least one pixel, and proceeds to Step S800 if no mask processing has been applied. In Step S800, the process by the print controller 131 returns to Step S300 until the number of copies reaches the set number, and applies the image formation processing to the next sheet of printing paper.

In Step S500, the print controller 131 performs print stop processing after completion of printing to which the mask processing has been applied. That is, the print controller 131 stops printing after completion of image formation on a sheet of printing paper to which the mask processing has been applied. The reason for completing the image formation on the sheet of printing paper to which the mask processing has been applied is for use in identifying an anomaly in the sheet of printing paper. The print controller 131 notifies the high-speed printing apparatus 100 of the stop of printing, and transmits the coordinate values of the mask start pixel and the mask end pixel to the personal computer 200.

In Step S600, the anomaly estimation section 220 performs abnormal mode estimation processing. In the abnormal mode estimation processing, the anomaly estimation section 220 reads the image data as a target of printing from the storage 240 to estimate a cause of the anomaly in the sheet of printing paper to which the mask processing has been applied using the coordinate values of the mask start pixel, the coordinate values of the mask end pixel, and the image data.

The anomaly estimation section 220 converts the coordinate values of the mask start pixel and the mask end pixel into coordinate values based on pixels of the image data before RIP. As a result, coordinate values of a mask start pixel 51 and a mask end pixel E1 become coordinate values indicating positions relative to pixels represented by the image data.

Figure 6:
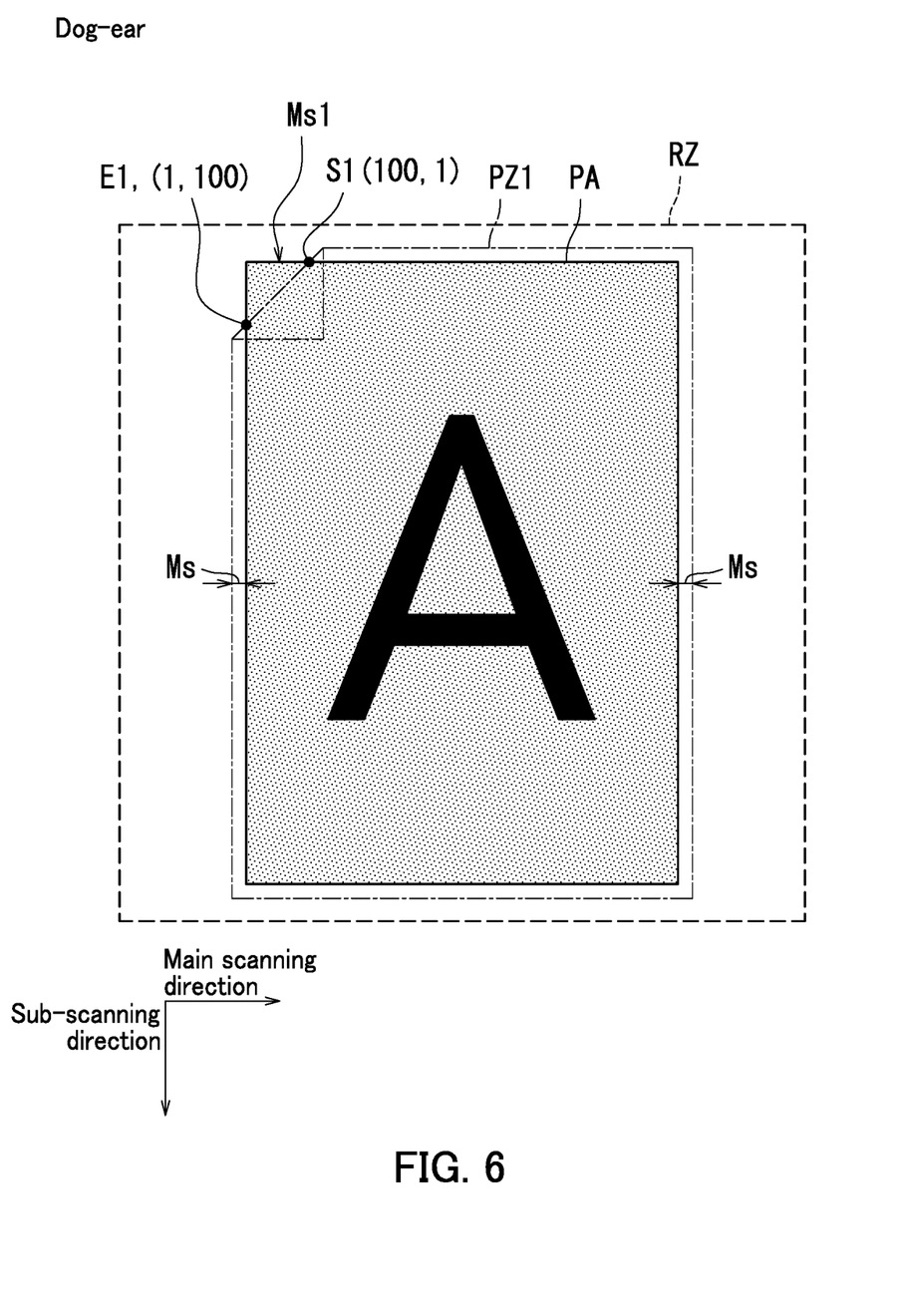
FIG. 6 is a descriptive diagram illustrating a dog-eared state of a sheet of printing paper.

FIG. 6 is a descriptive diagram illustrating a dog-eared state of a sheet of printing paper P1. FIG. 6 illustrates the medium area PZ1 used for mask processing within the image reading range RZ. The medium area PZ1 includes no misalignment or skew in the main scanning direction or the sub-scanning direction, and has the print target area PA with margins MS set in inner peripheral portions of the medium area PZ1. In this example, the sheet of printing paper P1 is dog-eared, and the outside-medium area Ms1 occurs due to the dog-ear. Assuming that no mask processing is applied, the outside-medium area Ms1 is an area outside the sheet of printing paper on which ink droplets are ejected.

In a coordinate system of the print data, the print target area PA has 5,000 pixels in an X-axis direction (main scanning direction) and 7,000 pixels in a Y-axis direction (sub-scanning direction). In this example, coordinate values of the mask start pixel 51 are (100, 1), and coordinate values of the mask end pixel E1 are (1, 100).

In the case where both the coordinate values of the mask start pixel 51 and the coordinate values of the mask end pixel E1 are in the vicinity of any of the four corners of the sheet of printing paper, namely the four corners of (1, 1), (5000, 1), (1, 7000) and (5000, 7000) in this example, the image formation controller 210 can estimate that a dog-ear would be a cause of the outside-medium area Ms1. This is because the dog-ear occurs exclusively in the vicinity of the corners of the sheet of printing paper.

In Step S700, the image formation controller 210 performs anomaly contents display processing. In the anomaly contents display processing, the image formation controller 210 determines an error mode based on a preset error criterion. In the present embodiment, it is assumed that the error criterion for the dog-ear is based on a concept that both the coordinate values of the mask start pixel 51 and the coordinate values of the mask end pixel E1 are present within 50% from a common corner of the sheet of printing paper (that is, within 2,500 pixels in the X-axis direction and 3,500 pixels in the Y-axis direction).

In this example, the coordinate values of the mask start pixel S1 and the coordinate values of the mask end pixel E1 are (100, 1) and (1, 100), respectively, and therefore within 50% from the corner (1, 1). The image formation controller 210 causes the operation display section 230 to display the cause of a mask processing target, namely the "dog-ear" as a result of anomaly estimation.

Figure 7:
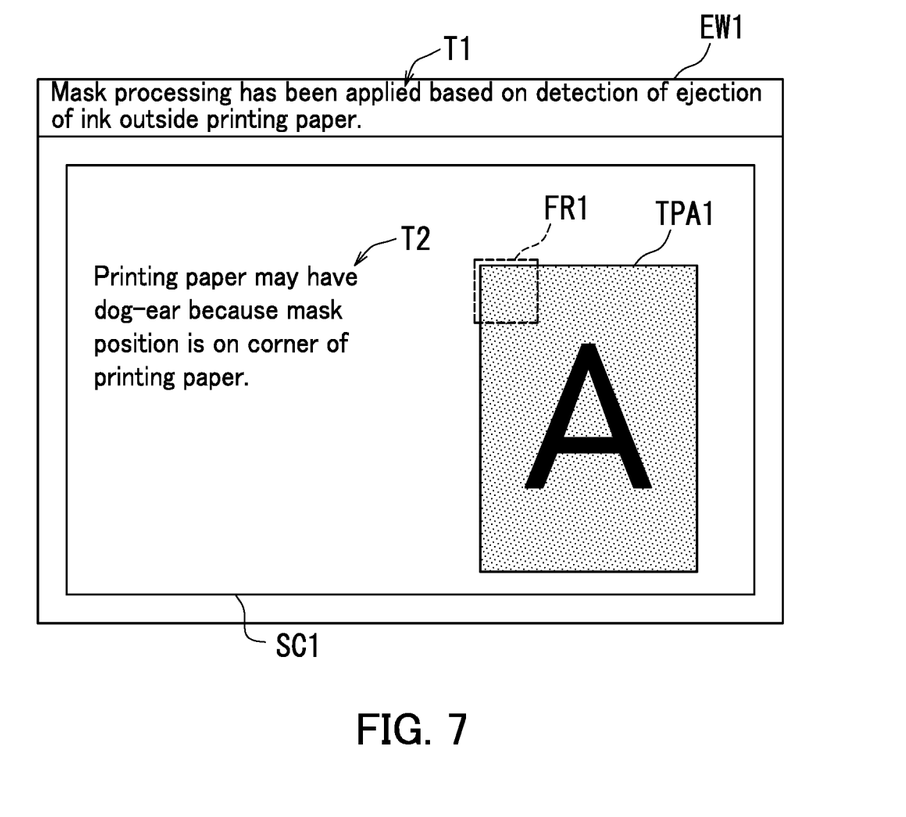
FIG. 7 is a descriptive diagram illustrating an error display screen indicating a dog-ear as a result of anomaly estimation.

FIG. 7 is a descriptive diagram illustrating an error display screen EW1 indicating a dog-ear as a result of anomaly estimation. A text message T1 and a descriptive area SC1 are displayed on the error display screen EW1. The text message T1 indicates that the mask processing has been applied. The descriptive area SC1 indicates contents of the result of anomaly estimation. A text message T2 and a print target image TPA1 are displayed in the descriptive area SC1. The text message T2 indicates contents of the result of anomaly estimation. A frame display FR1 is superimposed on the print target image TPA1. The frame display FR1 is a frame symbol indicating an area to which the mask processing has been applied. The frame symbol corresponds to a display. The anomaly estimation section 220 reads the text message T1 and the text message T2 from for example a text message list that is prepared in advance, thereby generating the text message T1 and the text message T2.

The text message T1 is a text display showing "Mask processing has been applied based on detection of ejection of ink outside printing paper." The contents of the anomaly indicate that ink being to be ejected outside the sheet of printing paper has been detected in advance and the ink has been prevented from being ejected. The text message T2 indicates that the anomaly estimation section 220 has estimated that the anomaly in the sheet of printing paper is a "dog-ear" and has interpreted, as the basis, "Mask position is in corner of printing paper." The text message indicating a result of estimation on a cause of a mask processing target corresponds to a first text message. The text message indicating interpretation as the basis of the result of estimation corresponds to a second text message.

The print target image TPA1 is displayed based on the image data read from the storage 240. The print target image TPA1 is an image in which it is assumed that the sheet of printing paper is normal and no mask processing is applied thereto. The frame display FR1 is a rectangular frame symbol with diagonal vertices at both the coordinates of the mask start pixel S1 and the coordinates of the mask end pixel E1, or a rectangular frame symbol which is slightly larger than the rectangular frame symbol with the diagonal vertices. The frame display FR1 is one size larger rectangular frame symbol and contains an area to which the mask processing has been applied.

This enables the user to refer to the contents of the error display screen EW1 and verify the printed matter to which the mask processing has been applied during printing to specify the contents of the anomaly. At this time, the user can consider the "dog-ear" as a first candidate of the error mode to identify the contents of the anomaly, and view a display of the interpretation by the high-speed printing apparatus 100 about the mask processing target that is the target area of the mask processing as the basis of the determination of the contents of the anomaly. It is therefore possible to reduce the user's burden when identifying the anomaly. Thus, the high-speed printing apparatus 100 assists the user in identifying the anomaly in the sheet of printing paper.

Figure 8A:
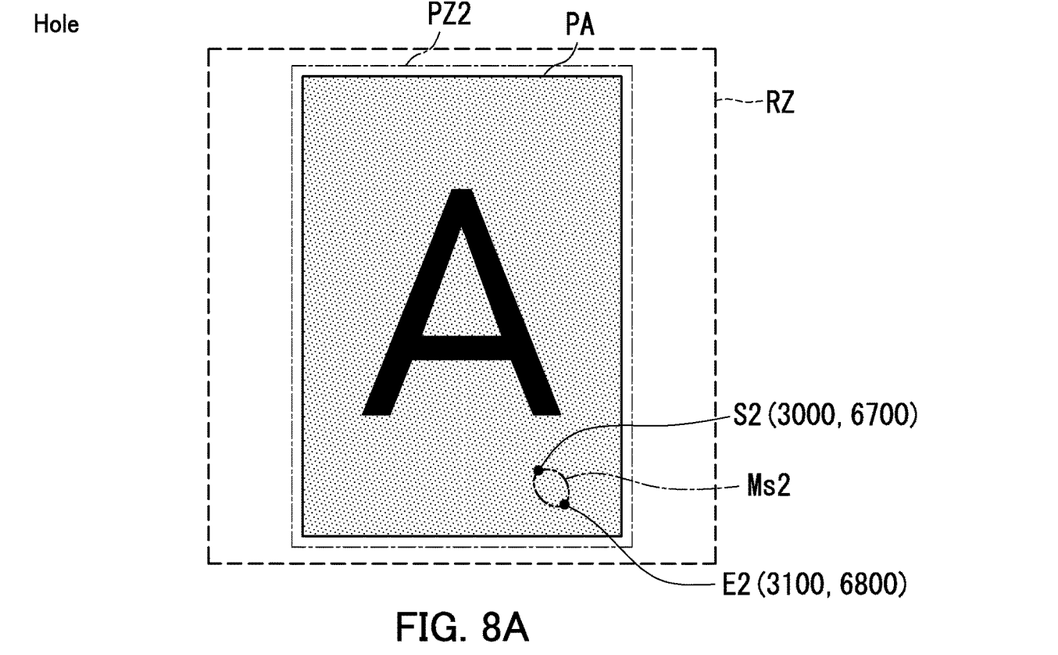
FIGS. 8A and 8B are descriptive diagrams indicating that a result of anomaly estimation on a sheet of printing paper is a hole.

FIGS. 8A and 8B are descriptive diagrams indicating that a result of anomaly estimation on a sheet of printing paper is a hole. FIG. 8A illustrates that a cause of the outside-medium area Ms2 (see FIG. 2) is a hole in the sheet of printing paper. In the case where a hole is present in the sheet of printing paper P, the monochrome line scanner 121 generates medium area data representing the medium area PZ2.

In this example, coordinate values of a mask start pixel S2 are (3000, 6700) and coordinate values of a mask end pixel E2 are (3100, 6800). Therefore, both the coordinate values of the mask start pixel S2 and the coordinate values of the mask end pixel E2 are present inside the outer contour of the medium area PZ2.

Figure 8B:
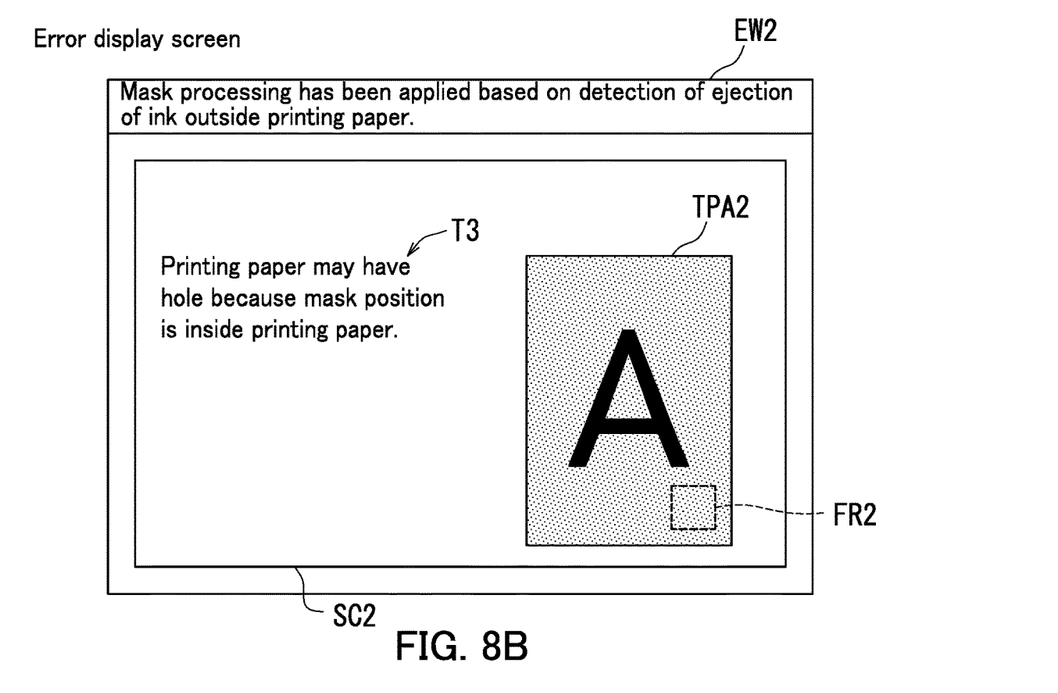

FIG. 8B illustrates an error display screen EW2 in the case where a result of estimation on an anomaly in a sheet of printing paper is a hole. In a descriptive area SC2 of the error display screen EW2, a text message T3 indicates that the anomaly estimation section 220 has estimated that the anomaly in the sheet of printing paper is a "hole" and has interpreted, as the basis, that "mask position is inside printing paper." A frame display FR2 superimposed on a print target image TPA2 depicts, by a rectangular symbol, an area to which the mask processing has been applied, namely an area with a hole therein.

This enables the user to refer to contents of the error display screen EW2, verify the printed matter to which the mask processing has been applied during printing, and consider a "hole" as a first candidate in the error mode, thereby specifying contents of the anomaly with a small burden.

Figure 9A:
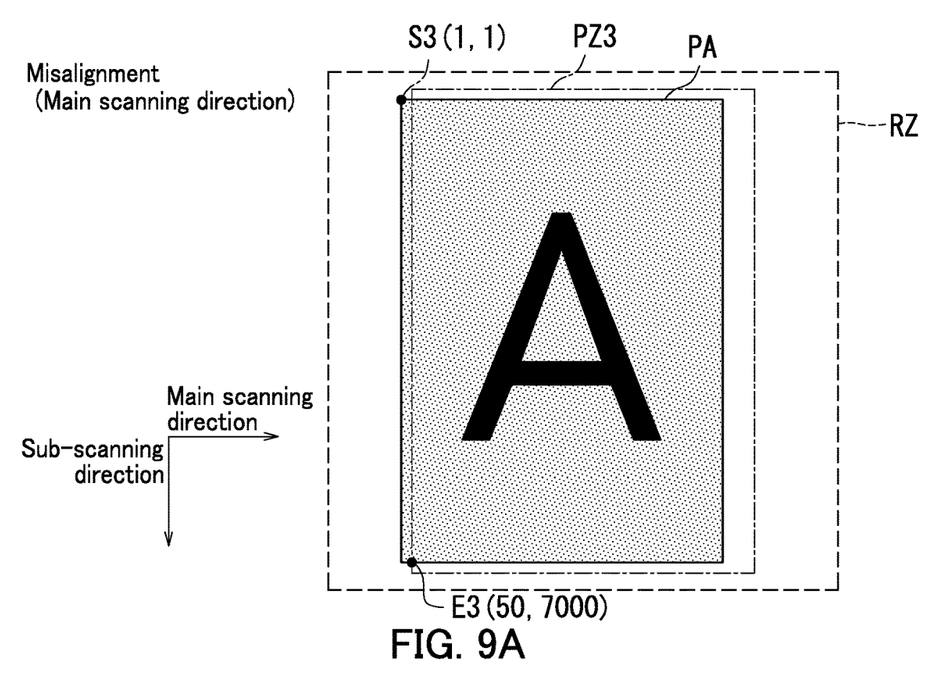
FIGS. 9A and 9B are descriptive diagrams indicating that a result of anomaly estimation on a sheet of printing paper is misalignment.
Figure 9B:
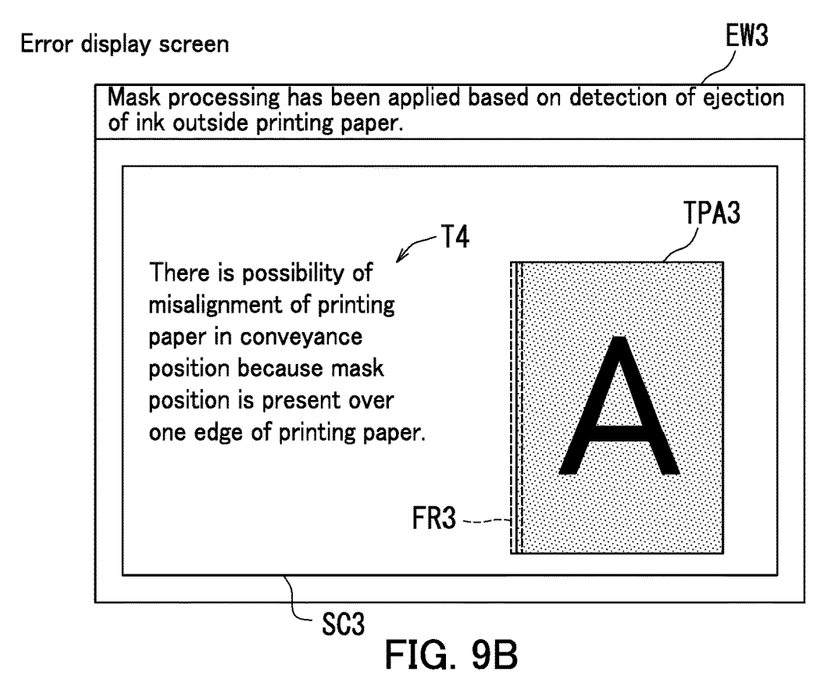

FIGS. 9A and 9B are descriptive diagrams indicating that a result of anomaly estimation on a sheet of printing paper is misalignment. FIG. 9A illustrates that a cause of an outside-medium area is misalignment of the sheet of printing paper in the main scanning direction. In the case where the sheet of printing paper is misaligned in the main scanning direction, the monochrome line scanner 121 generates medium area data representing a medium area PZ3.

In this example, coordinate values of a mask start pixel S3 are (1, 1) and coordinate values of a mask end pixel E3 are (50, 7000). Therefore, both the coordinate values of the mask start pixel S3 and the coordinate values of the mask end pixel E3 are in the vicinity of one of ends of the medium area PZ3 in the main scanning direction, namely in a range that is set from one end thereof in advance. In addition, each of the mask start pixel S3 and the mask end pixel E3 is within a range that is set from both the ends in the conveyance direction in advance. That is, the anomaly estimation section 220 has interpreted the anomaly as "mask position is present over all of one edge of printing paper."

FIG. 9B illustrates an error display screen EW3 in the case where a result of estimation on an anomaly in a sheet of printing paper is misalignment. In a descriptive area SC3 of the error display screen EW3, a text message T4 indicates that the anomaly estimation section 220 has estimated that the anomaly in the sheet of printing paper is "misalignment of printing paper in conveyance position" and has interpreted, as the basis, that "mask position is present over all of one edge of printing paper." A frame display FR3 superimposed on a print target image TPA3 depicts, by a rectangular symbol, an area to which mask processing has been applied, namely an area estimated to be a protruding area of the print target area PA.

This enables the user to refer to contents of the error display screen EW3, verify the printed matter to which the mask processing has been applied during printing, and consider "misalignment of printing paper in conveyance position" as a first candidate in the error mode, thereby specifying contents of the anomaly with a small burden.

Figure 10A:
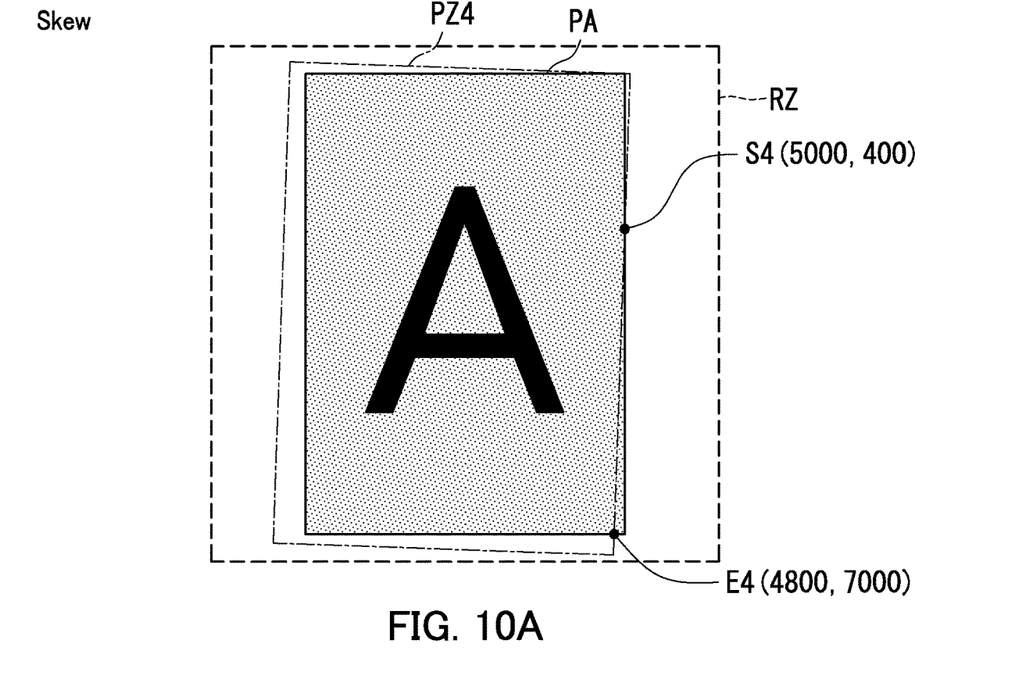
FIGS. 10A and 10B are descriptive diagrams indicating that a result of anomaly estimation on a sheet of printing paper is skew.
Figure 10B:
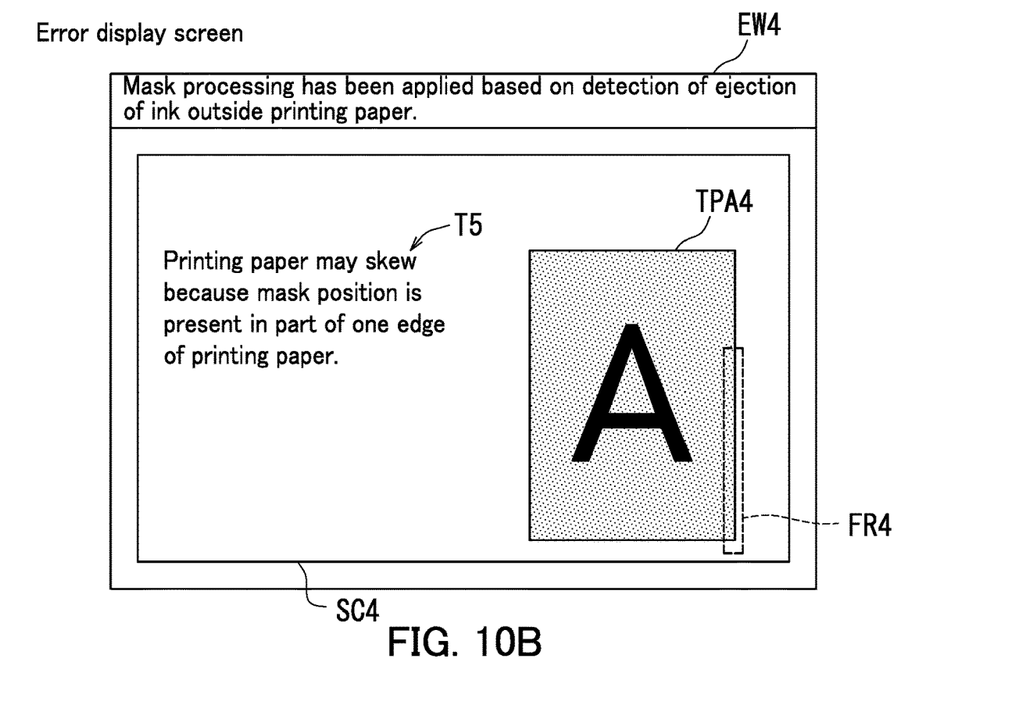

FIGS. 10A and 10B are descriptive diagrams indicating that a result of estimation on an anomaly in a sheet of printing paper is skew. FIG. 10A illustrates that a cause of an outside-medium area is skew in conveyance of a sheet of printing paper. In the case where skew occurs in the sheet of printing paper, the monochrome line scanner 121 generates medium area data representing a medium area PZ4.

In this example, coordinate values of a mask start pixel S4 are (5000, 400) and coordinate values of a mask end pixel E4 are (4800, 7000). Therefore, the coordinate values of the mask start pixel S4 and the coordinate values of the mask end pixel E4 are limited to part of the medium area PZ4 in the sub-scanning direction, and the mask start pixel S4 and the mask end pixel E4 are present in the vicinity of an end of the medium area PZ4 in the main scanning direction.

FIG. 10B illustrates an error display screen EW4 in the case where a result of estimation on an anomaly in a sheet of printing paper is skew. In a descriptive area SC4 of the error display screen EW4, a text message T5 indicates that the anomaly estimation section 220 has estimated that the anomaly in the sheet of printing paper is "Printing paper (may) skew" and has interpreted, as the basis, that "mask position is present in part of one edge of printing paper." A frame display FR4 superimposed on a print target image TPA4 depicts, by a rectangular symbol, an area to which mask processing has been applied, namely a protruding area of the print target area PA from the medium area PZ4 due to skew.

This enables the user to refer to contents of the error display screen EW4, verify the printed matter to which the mask processing has been applied during printing, and consider "Skew of printing paper" as a first candidate in the error mode, thereby specifying contents of the anomaly with a small burden.

Thus, the high-speed printing system 10 according to the embodiment can detect the outside-medium area to apply the mask processing thereto. As a result, the high-speed printing system 10 can perform printing on a print medium from which an anomaly has been detected while preventing outside-medium ejection onto the medium conveyor belt 161, thereby providing the user with a printed matter from which the anomaly in the print medium has been detected.

In addition, the high-speed printing system 10 can specify a position of an outside-medium area only by acquiring coordinate values of a mask start pixel and coordinate values of a mask end pixel to effectively estimate an error mode of a sheet of printing paper based on the position of the outside-medium area. The high-speed printing system 10 can explain and express a result of an error mode and interpretation of a position of an outside-medium area as a basis of the result in characters through the operation display section 230, and superimpose a frame display representing the position of the outside-medium area on a print target image to display the outside-medium area as an image.

In this way, the user can confirm the basis of the result of the error mode though the position of the outside-medium area expressed in characters, and confirm the position of the outside-medium area by the error display screens EW1 to EW4 shown with a frame display as an image. Accordingly, the high-speed printing system 10 can visually verify validity of the result of estimation on the error mode in an easy-to-understand manner, and thus can reduce a burden of a user who specifies a cause of an outside-medium area.

The present disclosure can be implemented not only in the above embodiment but also in the following variations.

First variation: although resolution of medium area data is the same as that of the image formation control data in the above embodiment, the resolution of the medium area data may be for example half of that of the image formation control data. In this case, it is determined based on one pixel of the medium area data whether or not each of four pixels of the image formation control data is a mask processing target.

Second variation: although the above embodiment of the present disclosure is applied to the high-speed printing system including the high-speed printing apparatus and the personal computer, the present disclosure may be applied to a high-speed printing apparatus or other image forming apparatus alone. The image forming apparatus has a broad meaning and includes a high-speed printing system.

What is claimed is:

1. An image forming apparatus comprising:
    an image forming section configured to eject ink on an image formation medium based on image data to form an image;
    a conveyance section that has a conveyance path along which the image formation medium is to be conveyed to the image forming section;
    a mask data generator configured to generate medium area data in the conveyance path for identifying an image formable area, the image formable area being an area on the image formation medium on which the image is to be formed;
    a storage configured to store the medium area data in the conveyance path;
    an image processing section configured to form ink dots as pixels constituting the image, thereby generating image forming control data for reproducing the image data;
    an image formation controller configured to select a target pixel from the pixels, and determine whether or not the target pixel selected is in the image formable area based on the medium area data, the image formation controller setting the target pixel as a target of ink ejection if it is determined that the target pixel selected is in the image formable area, and setting the target pixel as a mask processing target where the ink ejection is restricted if it is determined that the target pixel selected is outside the image formable area;
    an anomaly estimation section configured to acquire a position of a mask start pixel and a position of a mask end pixel, use the position of the mask start pixel and the position of the mask end pixel to estimate a cause of the mask processing target, and generate a first text message indicating a result of estimation on the cause of the mask processing target, the position of the mask start pixel and the position of the mask end pixel being positions relative to the image represented by the image data, the mask start pixel being a target pixel first determined to be the mask processing target, the mask end pixel being a target pixel last determined to be the mask processing target; and
    an operation display section configured to, according to occurrence of the mask processing target, display the first text message and an area as the mask processing target wherein the area as the mask processing target is displayed with a frame that is superimposed on the image represented by the image data, the frame being generated using the position of the mask start pixel and the position of the mask end pixel and representing the area as the mask processing target.

2. The image forming apparatus according to claim 1, wherein
    in a case where both the position of the mask start pixel and the position of the mask end pixel are within a range that is set in advance from any one of four corners of the image represented by the image data, the anomaly estimation section generates the first text message indicating that the result of estimation is a dog-ear.

3. The image forming apparatus according to claim 1, wherein
    the anomaly estimation section generates a second text message indicating interpretation of the position of the mask start pixel and the position of the mask end pixel used as a basis of the estimation, and
    the operation display section displays the second text message.

4. The image forming apparatus according to claim 3, wherein
    in a case where both the position of the mask start pixel and the position of the mask end pixel are within a range that is set in advance from any one of four corners of the image represented by the image data, the anomaly estimation section generates the first text message indicating that the result of estimation is a dog-ear, and the second text message indicating that the interpretation is that both the position of the mask start pixel and the position of the mask end pixel are present in vicinity of any one of four corners of the image represented by the image data.

5. The image forming apparatus according to claim 1, wherein
    in a case where both the position of the mask start pixel and the position of the mask end pixel are within a range that is set in advance from any one of two ends, in a conveyance direction, of the image formation medium, the anomaly estimation section generates the first text message indicating that the cause of the mask processing target is misalignment of a conveyance position of the image formation medium when the position of the mask start pixel and the position of the mask end pixel are each within their respective ranges that are set in advance from two ends, in a direction intersecting the conveyance direction, of the image formation medium.

6. The image forming apparatus according to claim 1, wherein
    in a case where both the position of the mask start pixel and the position of the mask end pixel are within a range that is set in advance from any one of two ends, in a conveyance direction, of the image formation medium, the anomaly estimation section generates the first text message indicating that the cause of the mask processing target is skew when two ranges that are set in advance from two ends, in a direction intersecting the conveyance direction, of the image formation medium include only one of the positions of the mask start pixel and the mask end pixel.

7. The image forming apparatus according to claim 1, wherein
the anomaly estimation section generates the first text message indicating that the cause of the mask processing target is a hole in the image formation medium when both the position of the mask start pixel and the position of the mask end pixel are within the image represented by the image data.

8. The image forming apparatus according to claim 1, wherein
the conveyance section includes a medium conveyor belt having a conveyance surface, and
in a case where color of the target pixel is the same as color of the conveyance surface, the image formation controller determines that the target pixel is present outside the image formable area.

9. An image formation method comprising:
forming an image based on image data by an image forming section configured to eject ink on an image formation medium to form the image;
having a conveyance path along which the image formation medium is to be conveyed to the image forming section;
generating medium area data in the conveyance path for identifying an image formable area, the image formable area being an area on the image formation medium on which the image is to be formed;
storing the medium area data in the conveyance path;
forming ink dots as pixels constituting the image, thereby generating image formation control data for reproducing the image data;
selecting a target pixel from the pixels, determining whether or not the target pixel selected is in the image formable area based on the medium area data, setting the target pixel as a target of ink ejection if it is determined that the target pixel selected is in the image formable area, and setting the target pixel as a mask processing target where the ink ejection is restricted if it is determined that the target pixel selected is outside the image formable area;

acquiring a position of a mask start pixel and a position of a mask end pixel, using the position of the mask start pixel and the position of the mask end pixel to estimate a cause of the mask processing target, and generating a first text message indicating a result of estimation on the cause of the mask processing target, the position of the mask start pixel and the position of the mask end pixel being positions relative to the image represented by the image data, the mask start pixel being a target pixel first determined to be the mask processing target, the mask end pixel being a target pixel last determined to be the mask processing target; and displaying, according to occurrence of the mask processing target, the first text message and an area as the mask processing target, wherein the area as the mask processing target is displayed with a frame that is superimposed on the image represented by the image data, the frame being generated using the position of the mask start pixel and the position of the mask end pixel and representing the area as the mask processing target.

* * * * *